US011312313B2

(12) United States Patent
Puldy et al.

(10) Patent No.: US 11,312,313 B2
(45) Date of Patent: Apr. 26, 2022

(54) BICYCLE RACK

(71) Applicant: Michael L. Puldy, Redondo Beach, CA (US)

(72) Inventors: Michael L. Puldy, Redondo Beach, CA (US); Rosty Rodriguez, Azusa, CA (US)

(73) Assignee: Michael L. Puldy, Redondo Beach, CA (US)

( * ) Notice: Subject to any disclaimer, the term of this patent is extended or adjusted under 35 U.S.C. 154(b) by 70 days.

(21) Appl. No.: 17/017,268

(22) Filed: Sep. 10, 2020

(65) Prior Publication Data

US 2022/0073007 A1 Mar. 10, 2022

(51) Int. Cl.
*B60R 9/10* (2006.01)
*B62H 3/04* (2006.01)
*B60R 11/00* (2006.01)

(52) U.S. Cl.
CPC .............. *B60R 9/10* (2013.01); *B62H 3/04* (2013.01); *B60R 2011/004* (2013.01); *B60R 2011/0052* (2013.01); *B60R 2011/0059* (2013.01)

(58) Field of Classification Search
CPC ............................... B60R 9/10; Y10S 224/924
USPC ......................................................... 224/924
See application file for complete search history.

(56) References Cited

U.S. PATENT DOCUMENTS

| | | | | |
|---|---|---|---|---|
| 5,305,936 | A * | 4/1994 | Nusbaum | B60R 9/06 211/17 |
| 6,283,310 | B1 * | 9/2001 | Dean | B60R 9/048 211/17 |
| 8,496,145 | B2 * | 7/2013 | Sautter | B60R 9/048 224/315 |
| 9,180,821 | B1 * | 11/2015 | Freet | B62H 3/10 |
| 9,896,034 | B2 * | 2/2018 | Ward | B60R 9/04 |
| 2002/0053581 | A1 * | 5/2002 | Peschmann | B60R 9/10 224/319 |

FOREIGN PATENT DOCUMENTS

| | | | | |
|---|---|---|---|---|
| FR | 2527149 A1 * | 11/1983 | | B60R 9/10 |
| GB | 2303344 A * | 2/1997 | | B60R 9/045 |

* cited by examiner

*Primary Examiner* — Scott T McNurlen
(74) *Attorney, Agent, or Firm* — Cislo & Thomas, LLP; Katherine B. Sales

(57) ABSTRACT

A bicycle rack configured to mount to a luggage rack on a vehicle and comprising a front wheel support and a frame support. The front wheel support comprises a first pair of elongate members configured to couple to the luggage rack, the first pair of elongate members each having a proximal end and a distal end, wherein the distal ends of the first pair of elongate members each comprise a U-shaped recess for supporting the front wheel of the bicycle. The frame support comprises an elongate main body having two opposed ends, a forks mount configured to couple to one of the opposed ends of the main body and to removably couple to the front forks of the bicycle, a rear frame support coupled the other opposed end of the main body, and a first support bracket configured to couple the main body to the luggage rack.

3 Claims, 9 Drawing Sheets

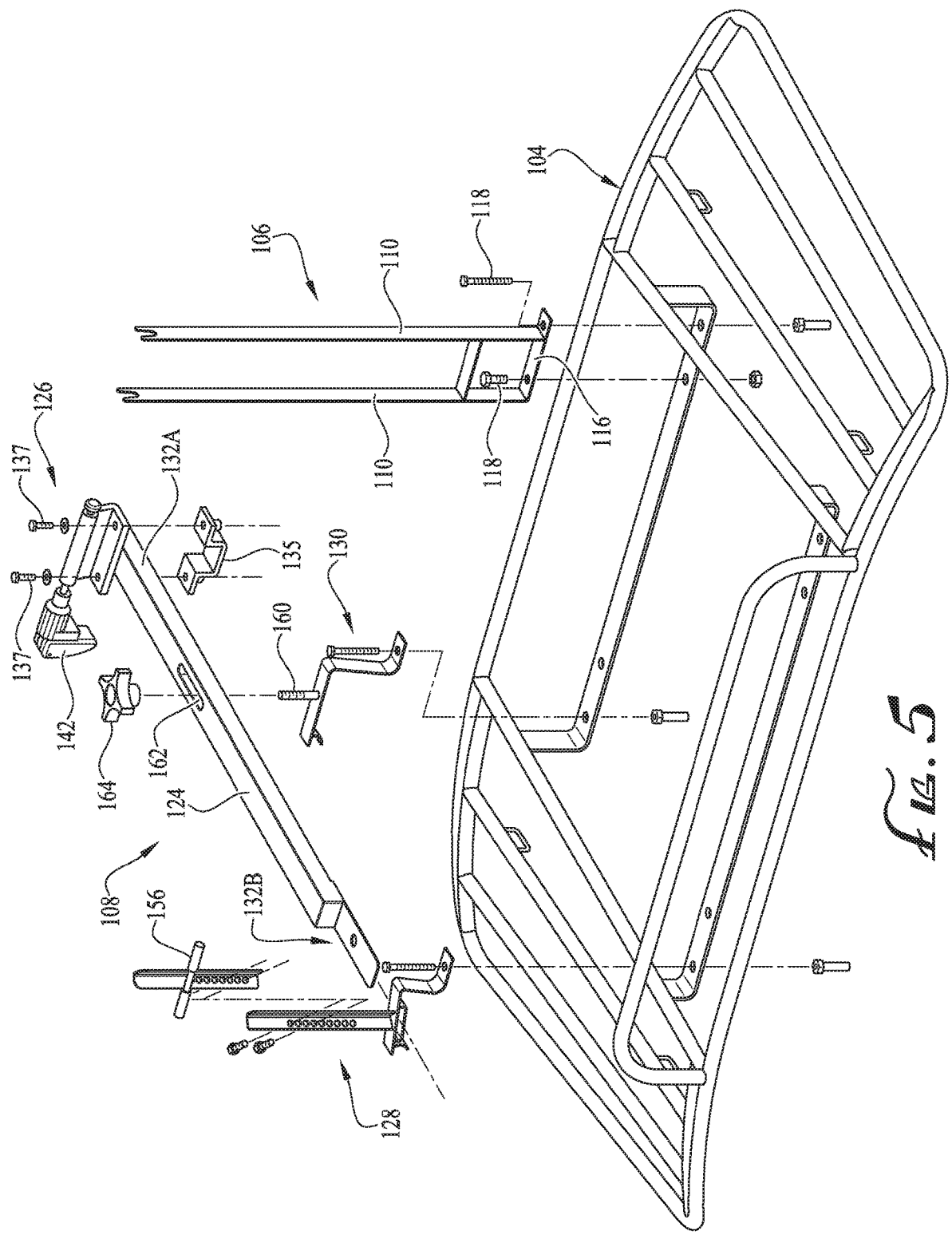

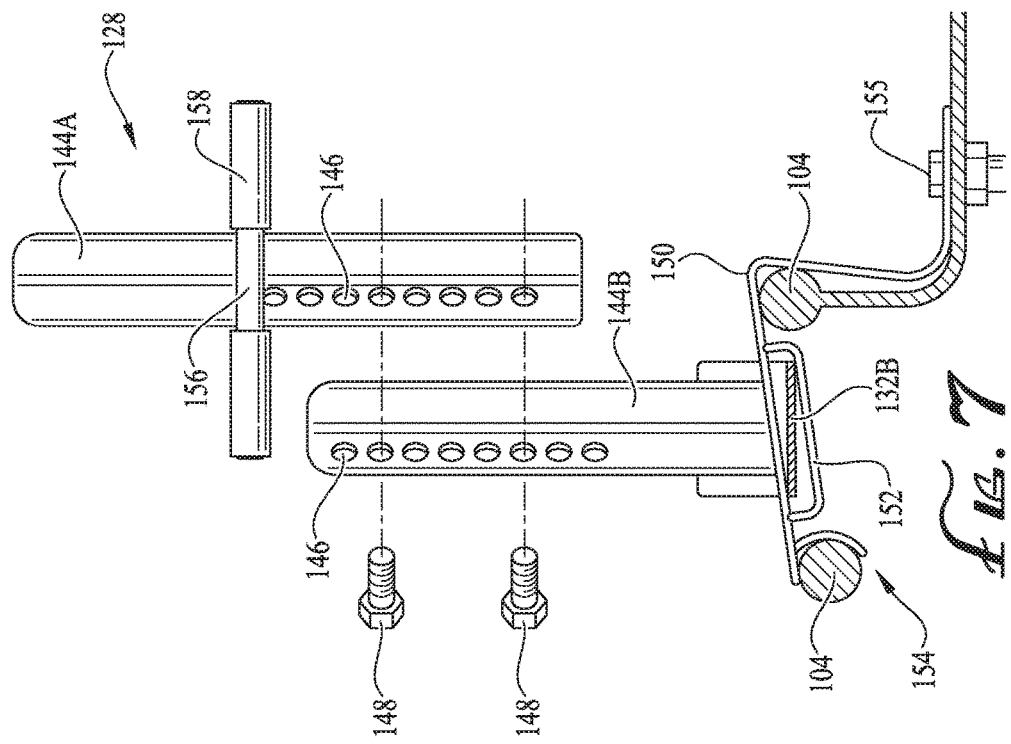
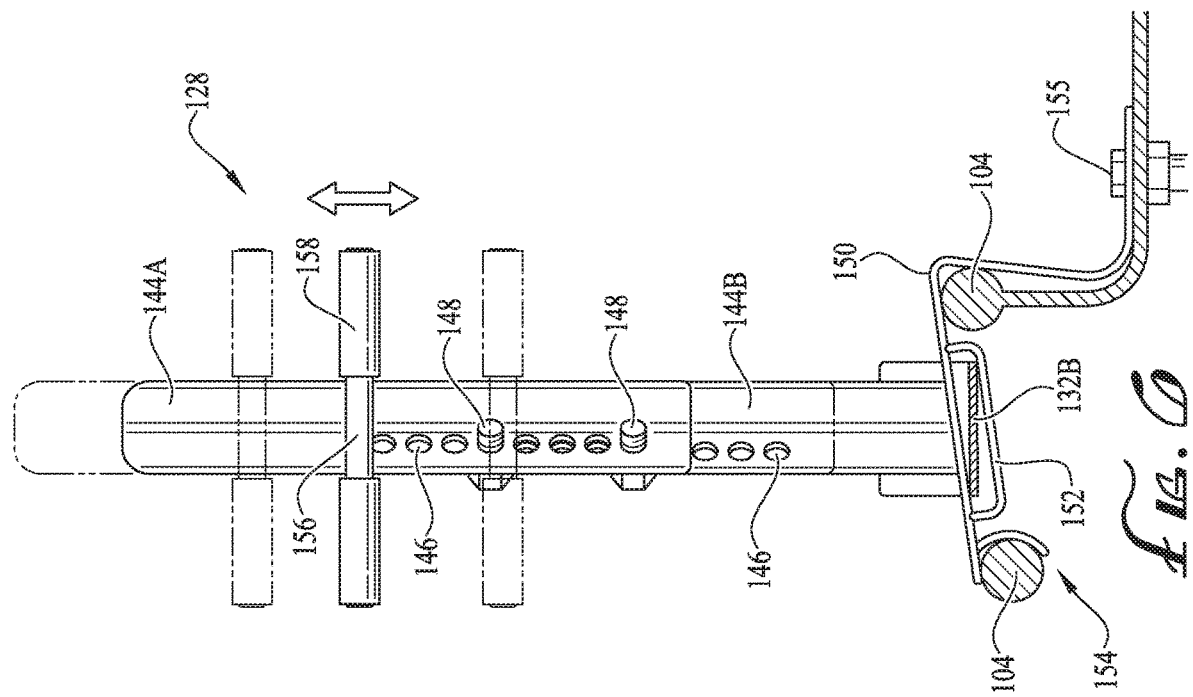

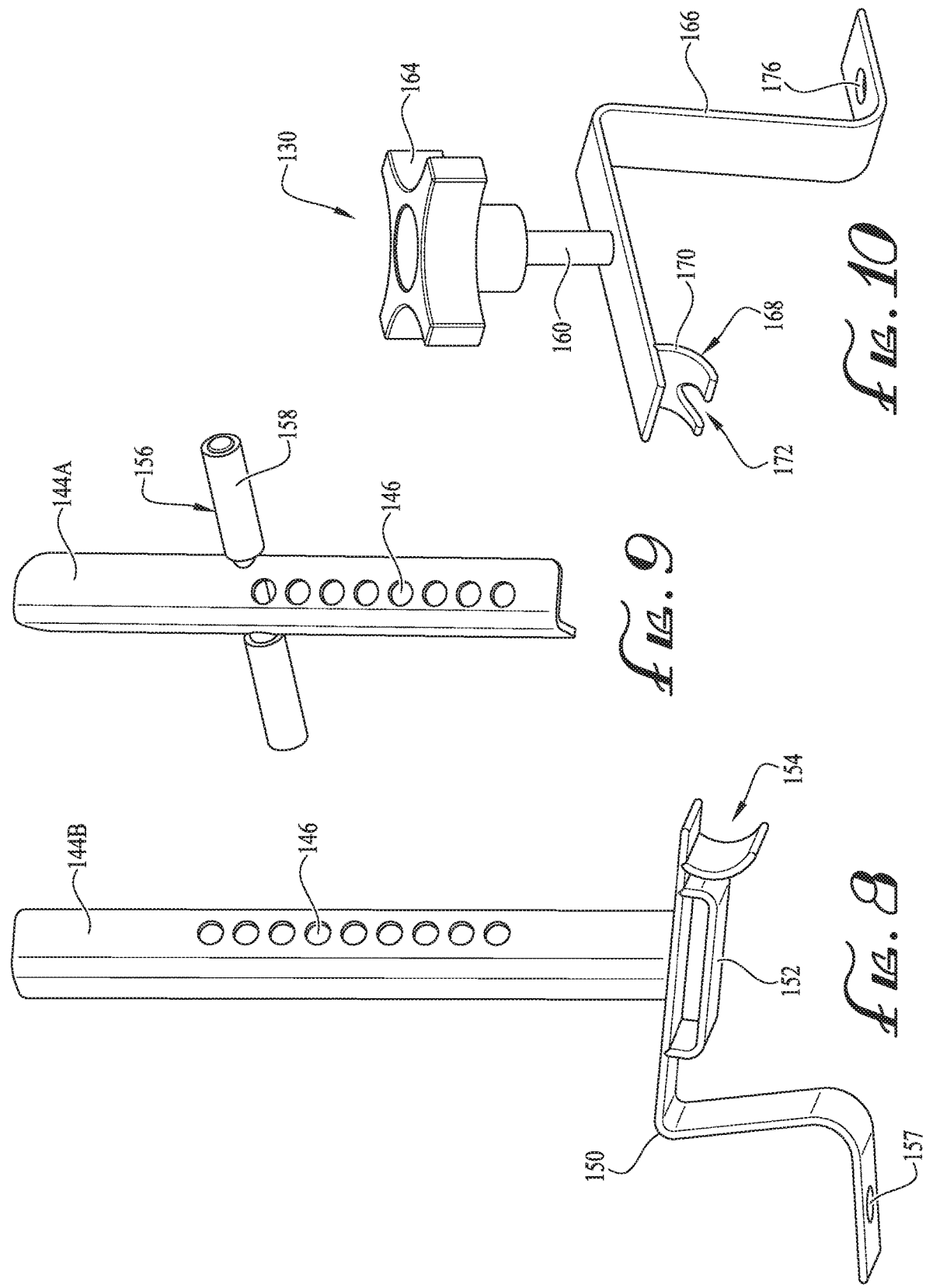

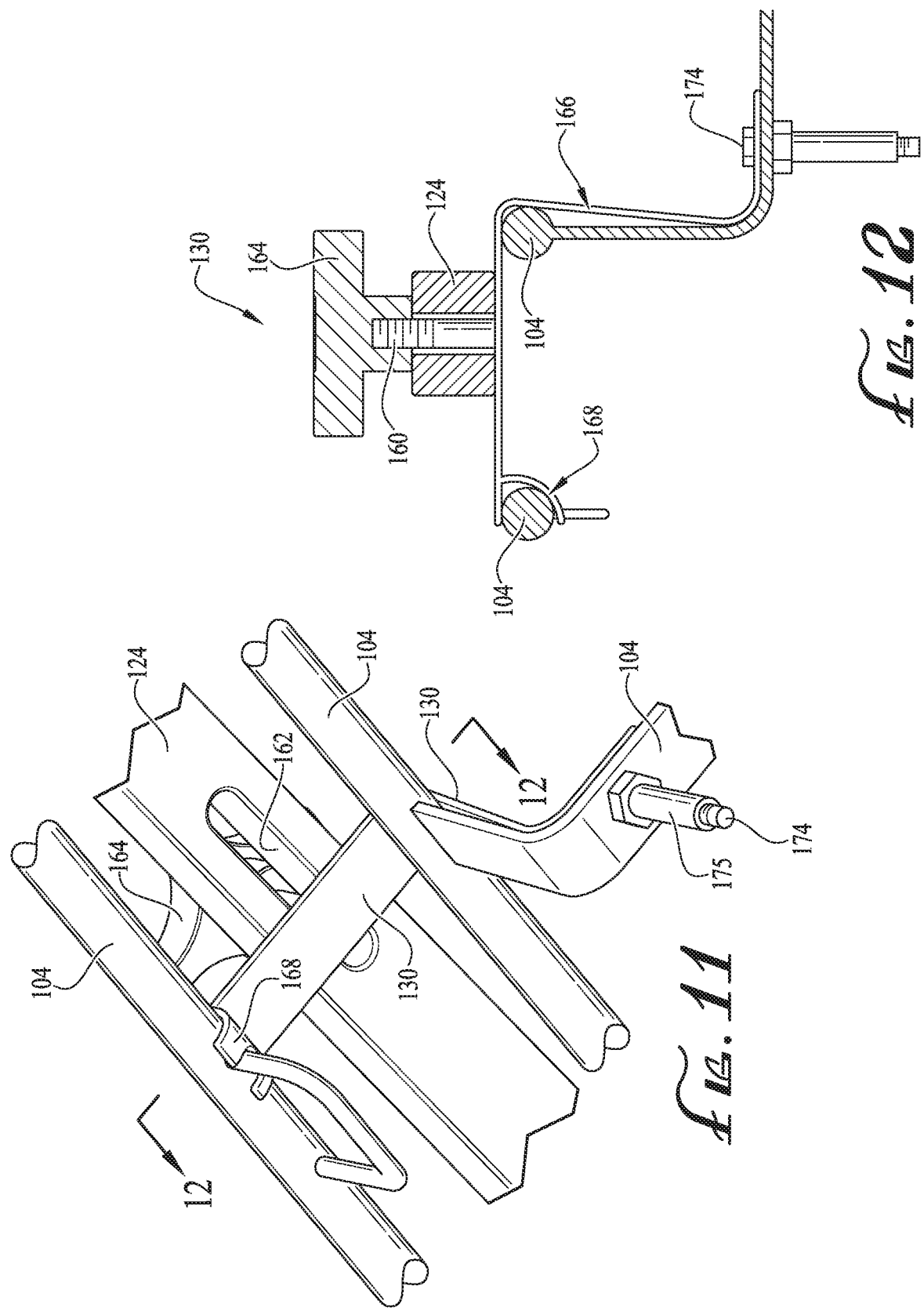

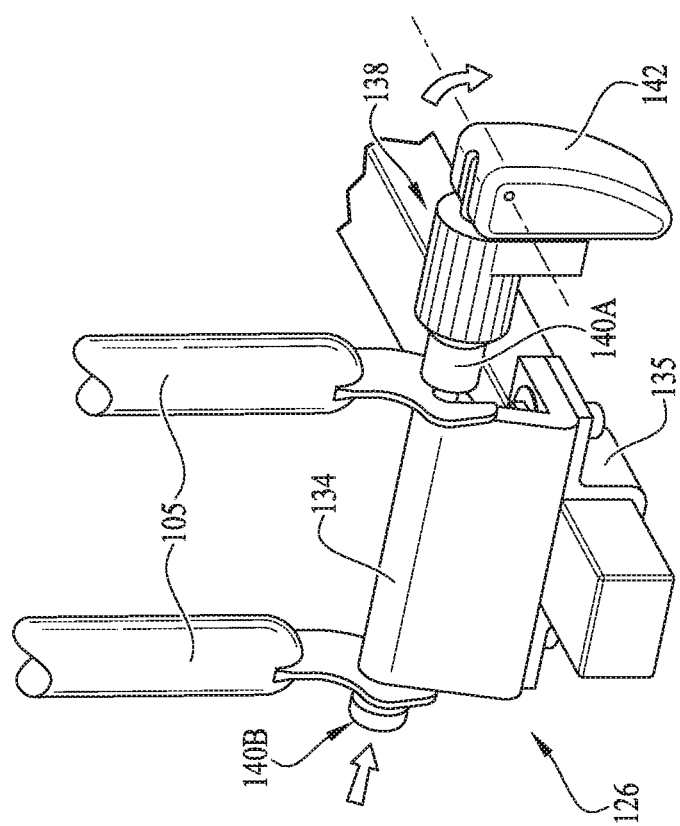
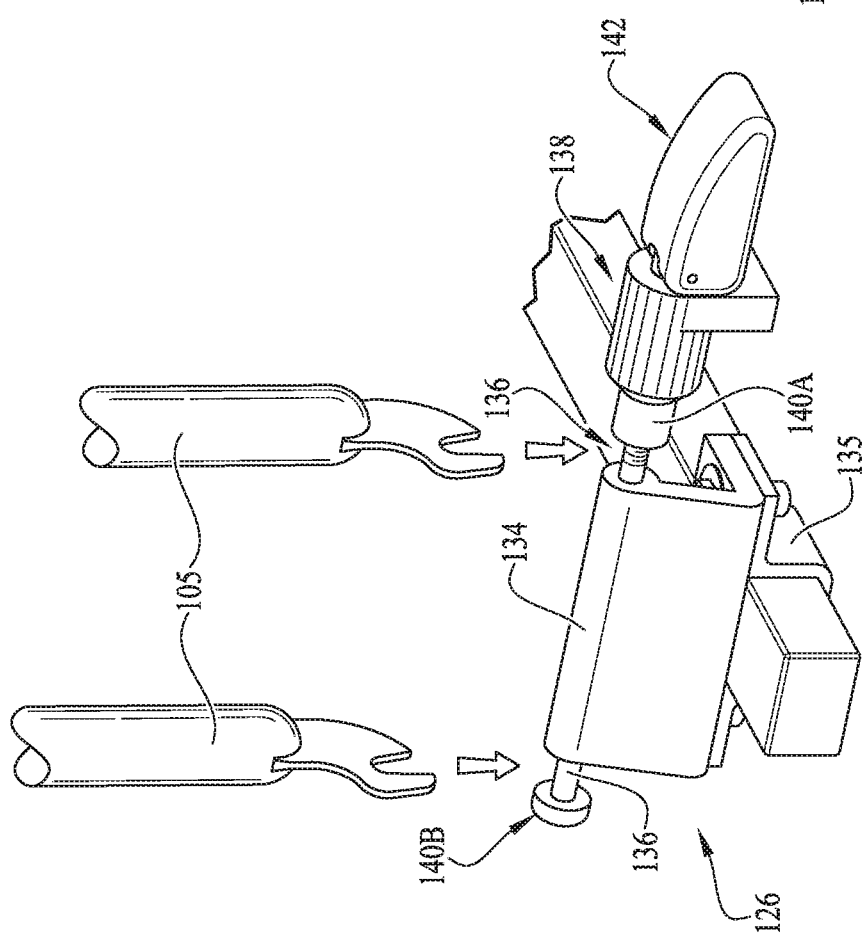

BICYCLE RACK

BACKGROUND

Porsche 356's are rare collector cars that have a unique configuration where a luggage rack can be coupled to the rear truck lid. However, there are no existing bicycle racks that can be used on a Porsche 356.

Thus, there is an unmet need for a bicycle rack for use on a 356 Porsche. The present invention addresses this need.

SUMMARY

The invention herein is directed to a bicycle rack configured to hold a bicycle. The bicycle has a frame, a pair of front forks, a front wheel, and a rear wheel. The bicycle rack is configured to mount to a luggage rack on a vehicle. The bicycle rack comprises a bicycle front wheel support and a bicycle frame support.

The bicycle front wheel support comprises a first pair of elongate members configured to couple to the luggage rack, the first pair of elongate members each having a proximate end and a distal end, wherein the proximate ends of the first pair of elongate members are configured to couple to the luggage rack and the distal ends of the first pair of elongate members each comprise a U-shaped recess for supporting the front wheel of the bicycle.

Optionally, the first pair of elongate members are coupled to each other by a base member, and the base member comprises at least one hole there through for coupling to the luggage rack with a fastener.

The bicycle frame support comprises an elongate main body having two opposed ends, a forks mount configured to couple to one of the opposed ends of the main body and to removably couple to the front forks of the bicycle, a rear frame support coupled the other opposed end of the elongate main body, and a first support bracket configured to couple the elongate main body to the luggage rack.

The forks mount comprises a hollow body, an axle disposed through the hollow body, the axle having two opposed ends comprising a first end and a second end, and a clamping assembly coupled to the first end of the axle. The clamping assembly comprises a spring biased locking handle and is configured to pull the second end of the axle towards the first end of the axle, thereby clamping the forks of the bicycle between the hollow body and the first and second ends of the axle.

Optionally, the rear frame support is adjustable and comprises a second pair of elongate members configured to releasably couple to each other. The rear frame support is adjustable to accommodate different sized bicycles.

Optionally, the second pair of elongate members of the rear frame support each comprises a plurality of holes there through for insertion of at least one fastener for securing the second pair of elongate members to each other.

Optionally, the second pair of elongate members comprises an upper member and a lower member, and the lower member is coupled to a second support bracket which is configured to secure both the rear frame support and the main body to the luggage rack.

Optionally, the first support bracket is adjustable and configured to couple the main body to the luggage rack. The first support bracket comprises a threaded rod configured for inserting through a hole in the main body and threadedly coupling to a rotating knob. Tightening of the knob on the threaded rod clamps the main body, securing the main body to the luggage rack.

Optionally, the rack can further comprise a pair of straps for securing the bicycle to the luggage rack.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 5 is an exploded rear perspective view of the bicycle rack of FIG. 3;

FIG. 6 is an enlarged sectional view of a rear frame support of the bicycle rack of FIG. 3, taken along 6-6 of FIG. 3;

FIG. 7 is an additional enlarged view of the rear frame support of FIG. 6, wherein an upper member has been removed from a lower member;

FIG. 8 is an enlarged view of the lower member of the rear frame support of FIG. 6;

FIG. 9 is an enlarged view of the upper member of the rear frame support of FIG. 6;

FIG. 10 is an enlarged view of a first support bracket of the bicycle rack of FIG. 3;

FIG. 11 is an enlarged, sectional, bottom view of the first support bracket coupled to the bicycle rack of FIG. 3;

FIG. 12 is a sectional view of the first support bracket of FIG. 11, taken along line 12-12 of FIG. 11;

FIG. 13 is enlarged view of a forks mount of the bicycle rack of FIG. 3, wherein the connection mechanism of the bicycle forks to the forks mount is shown; and FIG. 14 is an enlarged view of the forks mount of FIG. 13, wherein the locking mechanism of the forks mount is shown.

DETAILED DESCRIPTION

Figure 1:
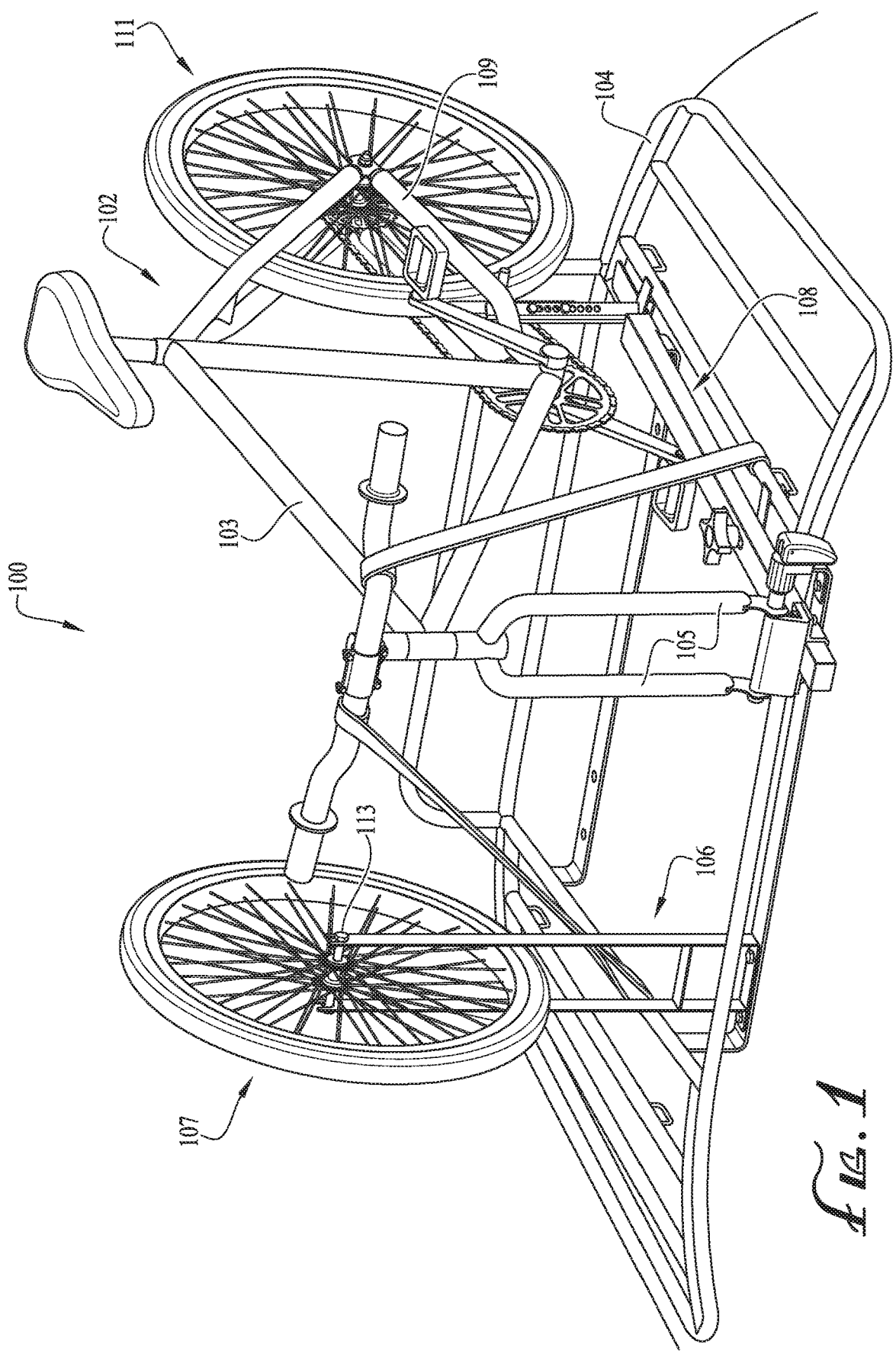
FIG. 1 is a front perspective view of my bicycle rack, having features of the present invention, wherein a bicycle is shown coupled to the bicycle rack.

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

Referring now to the drawings, wherein like reference numerals designate identical or corresponding features throughout the several views. Further, described herein are certain non-limiting embodiments of my pipeline filter assembly for pool filtering and maintenance.

The following discussion describes in detail multiple embodiments of the invention with several variations of those embodiments. This discussion should not be construed, however, as limiting the invention to those particular embodiments. Practitioners skilled in the art will recognize numerous other embodiments as well.

Referring now to FIG. 1, there is shown a bicycle rack 100 of the present invention, having a bicycle 102 coupled thereto. The bicycle 102 is a standard bicycle that has a frame 103, a pair of front forks 105, a front wheel 107, at least one rear wheel support 109, and a rear wheel 111. The bicycle rack 100 is specifically designed for coupling to a luggage rack 104 used on a Porsche 356. The luggage rack 104 is configure to couple to the rear truck lid of the Porsche 356.

Figure 2:
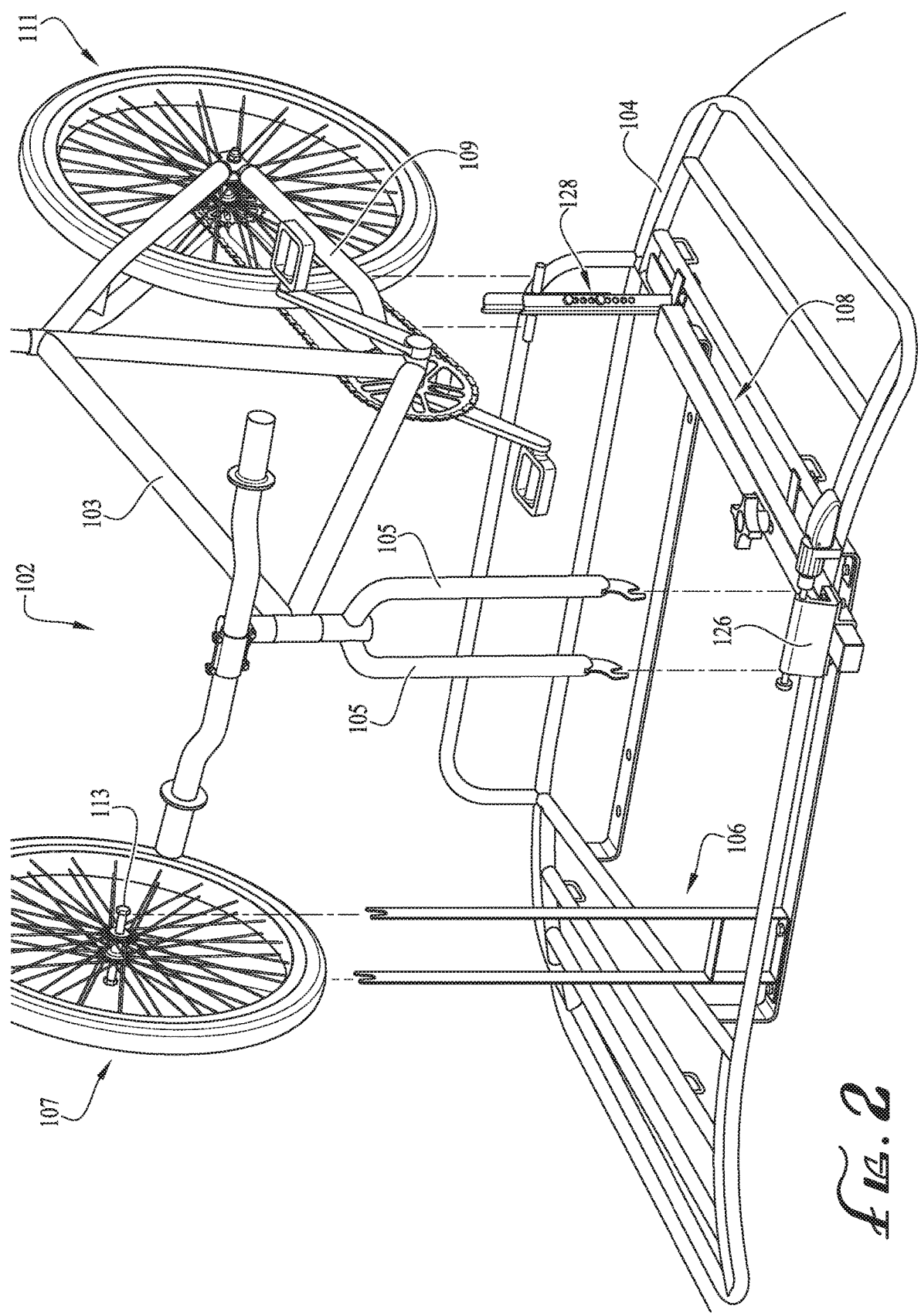
FIG. 2 is an additional front perspective view of the bicycle rack of FIG. 1, wherein removal of the bicycle from the rack is shown.

Referring now to FIG. 2, there is shown the bicycle rack 100 of the present invention, wherein removal of the bicycle 102 is shown. There are three attachment points between the bicycle 102 and the bicycle rack 100 that are shown.

Figure 3:
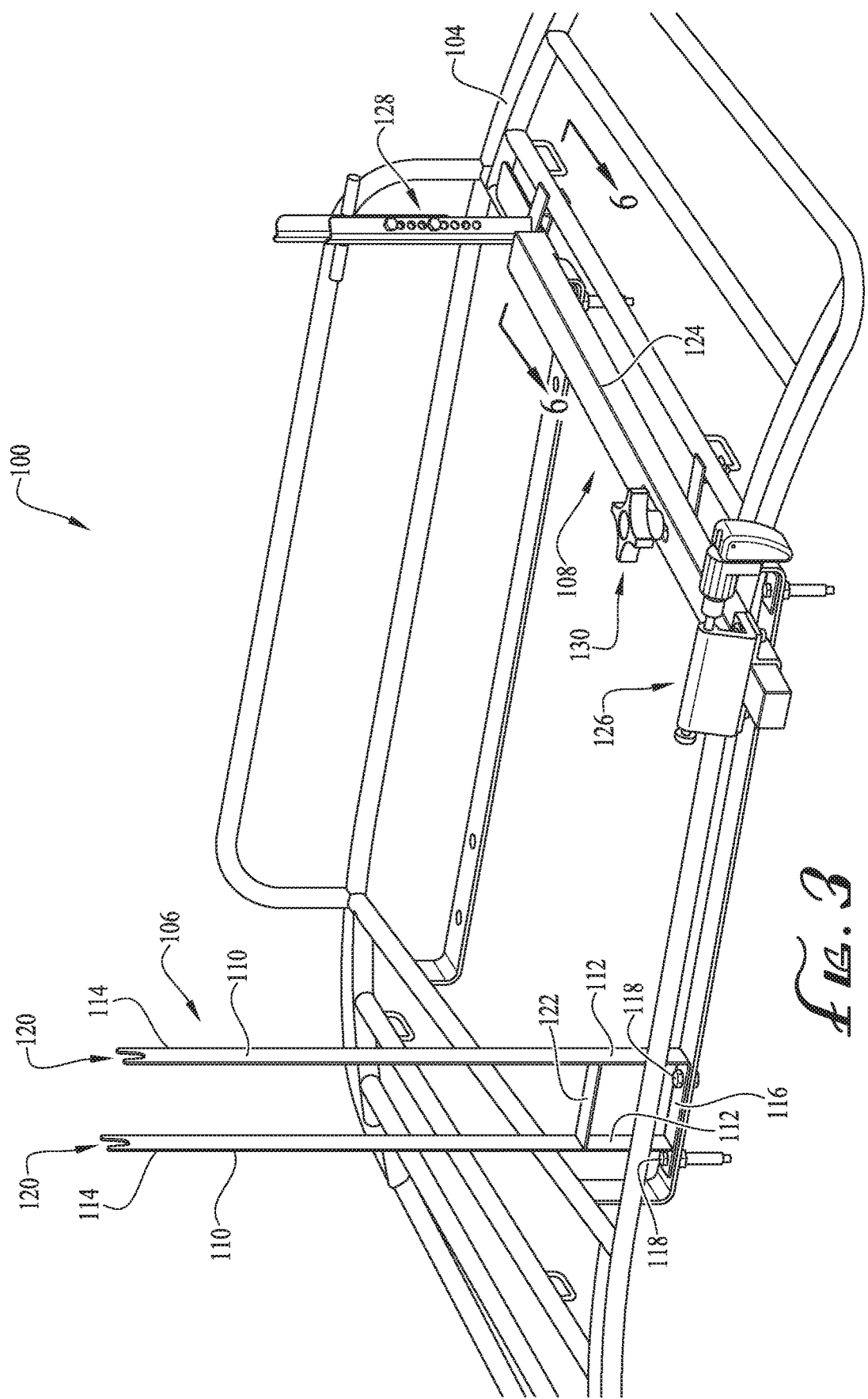
FIG. 3 is an additional front perspective view of the bicycle rack of FIG. 1, wherein only the rack itself is shown.
Figure 4:
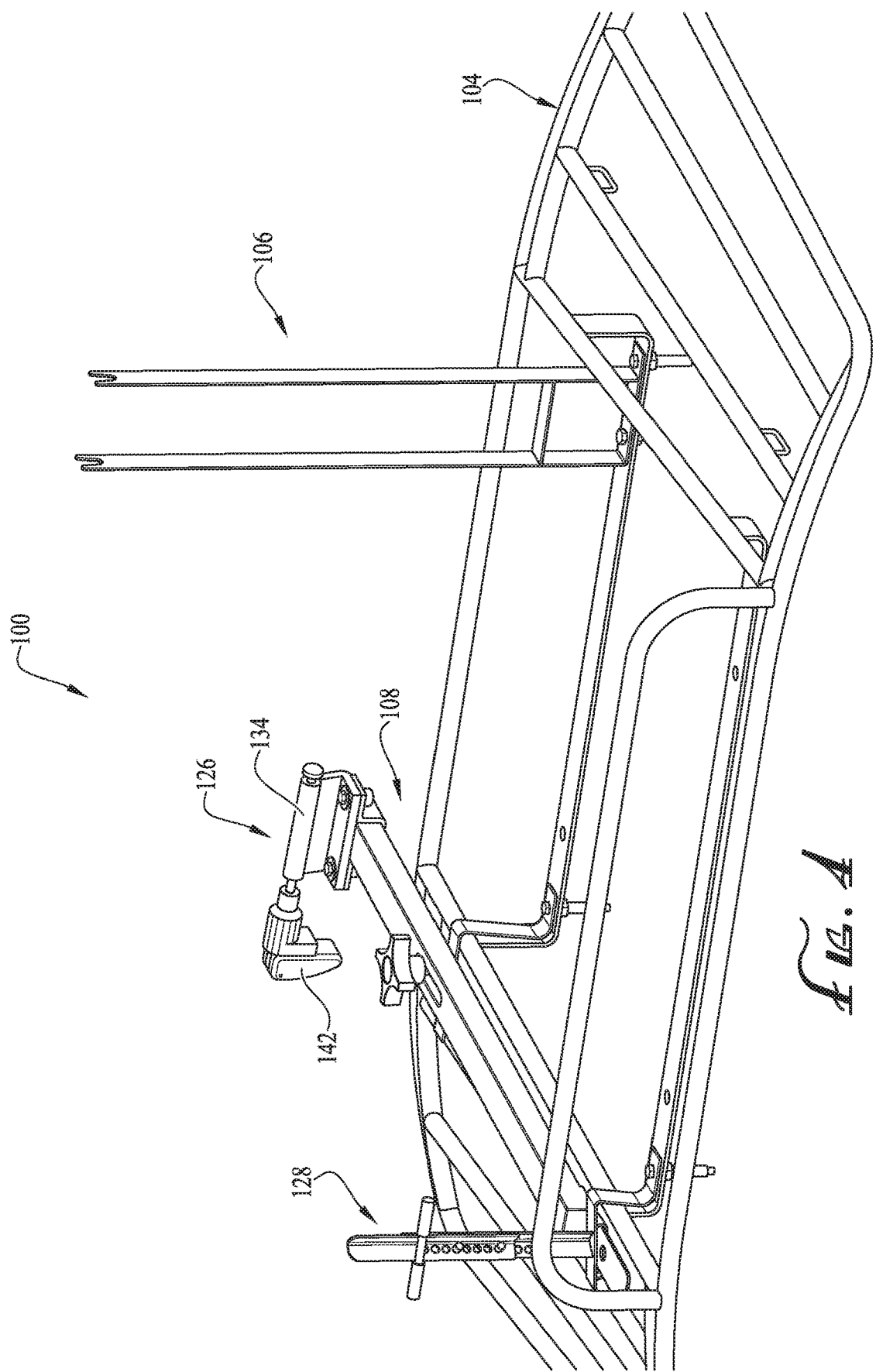
FIG. 4 is a rear perspective view of the bicycle rack of FIG. 3.

Referring now to FIGS. 3, 4 and 5, there is shown the bicycle rack 100 without the bicycle 102. The bicycle rack 100 comprises a bicycle front wheel support 106 and a bicycle frame support 108. The front wheel support 106 comprises a first pair of elongate members 110 configured to couple to the luggage rack 104. The each of the first pair of elongate members 110 have a proximate end 112 and a distal end 114, wherein the proximate ends 112 of the first pair of elongate members 110 are either coupled directly to the luggage rack 104, or are coupled to each other by a base member 116. If the base member 116 is used, the base member 116 can comprise at least one hole or opening there through for coupling to the luggage rack 104 with at least one fastener 118. In the drawings, there are two fasteners 118 shown. The fasteners 118 can be any type and combination of fasteners, including but not limited to screws, bolts with nuts, nails, rivets, zip ties, rope steel wire, and rods locked by one or more cotter pins. It should be noted that fasteners 118 do not need to be the same and can be two different types of fasteners, as shown in the drawings. Optionally, one or more of fasteners 118 are Porsche OEM bolts that are 8 mm wide by 76 mm long.

The distal ends 114 of the first pair of elongate members 110 each comprise a recess 120, preferably U-shaped, although the recesses 120 can be any shape, for receiving and supporting the front wheel 107 of the bicycle 102. Preferably, the front wheel 107 has an axle 113 that rests within the recesses 120. Optionally, the first pair of elongate member 110 can further comprises at least one brace 122 that couples the elongate members 110 to each other, providing greater support for holding and supporting the front wheel 107 of the bicycle 102. More than one brace 122 can be used in the event added stability is required.

The bicycle frame support 108 comprises an elongate main body 124, a forks mount 126, an adjustable rear frame support 128, and an adjustable first support bracket 130.

The elongate main body 124 comprises two opposed ends 132A, 132B. Preferably a portion of the elongate main body 124 comprises a length of square or boxed tubing. First end 132A is in the form of an end of the square or boxed tubing. Second end 132B is in the form of a length of flat bar that is configured to mate with a rear frame support 128, which is discussed in greater detail below. Main body 124 also comprises an elongate opening 162 disposed along a portion of main body 124, which is also discussed in greater detail below.

The forks mount 126 is configured to couple to one of the opposed ends 132A of the main body and to removably couple to the front forks 105 of the bicycle 102. As best seen in FIGS. 13 and 14, the forks mount 126 comprises a hollow body 134, an axle or rod 136 disposed through the hollow body 134, and a clamping assembly 138. The axle/rod 136 has two opposed ends comprising a first end 140A and a second end 140B. Body 134 couples to bracket 135 utilizing at least two fasteners 137, thereby clamping end 132A between body 134 and bracket 135. The fasteners 137 can be any type of fastener, including but not limited to screws, bolts with nuts, nails, rivets, zip ties, rope, steel wire, and rods locked by one or more cotter pins.

Additionally, due to the clamping configuration, forks mount 126 can be slid along end 132A, allowing placement of the forks mount 126 along main body 124 at the specific location desired by the user. This allows the bicycle rack 100 to be adjustable to accommodate different sizes and types of bicycles 102.

The clamping assembly 138 of the forks mount 126 is best seen in FIGS. 13 and 14. The clamping assembly 138 is coupled to the first end 140A of the axle/rod 136 and comprises a spring biased locking handle 142 that can pivot from an unlocked position, shown in FIG. 13, to a locked position, shown in FIG. 14. First end 140A is a moveable disc that axle 136 extends through, allowing first end 140A to slide along axle 136. Second end 140B is permanently and immovably coupled to axle 136.

When the handle 142 is in the unlocked position, both first end 140A and the second end 140B are spaced apart from the hollow body 134. When handle 142 is pivoted into in the locked position, handle 142 pulls on axle 136, thereby pulling the second end 140B towards first end 104A and handle 142. When the handle 142 pulls on the axle 136 (and therefore second end 140B of the axle 136) second end 140B is pulled toward hollow body 134, and at the same time, first end 140A (which is movable along axle 136), slides towards hollow body 134. The movement of both the first and second ends 140A, 140B clamps the forks 105 of the bicycle 102 between the hollow body 134 and the first and second ends 104A, 104B of the axle/rod 136. This clamping secures the forks 105 to the rack 100.

The adjustable rear frame support 128, which is best seen in FIG. 6 through 9, comprises a second pair of elongate members 144 configured to releasably couple to each other. Preferably, the second pair of elongate members 144 comprises an upper member 144A and a lower member 144B.

The elongate members 144 can each comprise a plurality of holes or openings 146 there through for insertion of at least one fastener 148 for securing the members 144 to each other. The fastener 148 can be any type of fastener, including but not limited to screws, bolts with nuts, nails, rivets, zip ties, rope, steel wire, and rods locked by one or more cotter pins.

Due to the plurality of holes 146, the members 144 are adjustable such that the height of the overall rear frame support 128 can be adjusted, as shown in FIG. 6, to accommodate bicycles 102 of different sizes/heights.

The lower member 144B is coupled to a second support bracket 150 which is configured to secure both the rear frame support 128 and the main body 124 of the bicycle rack 100 to the luggage rack 104. Second support bracket 150 has a slot 152 for receiving end 132B of the main body 124 as well as a luggage rack receiving portion 154 configured to receive a portion of the luggage rack 104. A fastener 155 passes through a hole 157 in second support bracket 150, as well as a corresponding hole in luggage rack 104, securing the second support bracket 150 (and therefore the bicycle rack 100) to luggage rack 104. The fasteners 155 can be any type of fastener, including but not limited to screws, bolts with nuts, nails, rivets, zip ties, rope, steel wire, and rods locked by one or more cotter pins. Preferably, fasteners 155 are Porsche OEM bolts that are 8 mm wide by 76 mm long.

Upper member 144A can have a bar 156 coupled thereto, wherein the bar 156 extends roughly perpendicular to longitudinal axis of the upper member 144A. The bar 156 can be coupled to the upper member 144A either via welding or some other form of permanent coupling, or via passing the bar 156 through an opening in member 144A. The rear wheel support 109 of the bicycle 102 can rest upon bar 156. Optionally, bar 156 has padded material 158 coupled to the bar 156 in order to prevent damage to the bicycle 102 finish.

The adjustable first support bracket 130 is best seen in FIGS. 10 through 12 and is configured to couple the main body 124 of the bicycle rack 100 to the luggage rack 104. The first support bracket 130 has a threaded rod 160 that is configured to insert through elongate opening 162 in the main body 124 of the bicycle rack 100. Elongate opening 162 is elongate in order to provide additional adjustability for the bicycle rack 100. First support bracket 130 can be positioned anywhere along opening 162, which allows bracket 130 the ability to change location depending upon the mounting position necessary to couple to luggage rack 104.

Rod 160 can be threadedly engaged with rotating knob 164, where tightening of the knob 164 on the threaded rod 160 clamps the main body 124 to the first support bracket 130, securing the main body 124, and therefore the bicycle rack 100 to the luggage rack 104. As can be seen in FIGS. 10 through 12, bracket 130 has a body 166 to which rod 160 is coupled. Body 166 also has a luggage rack receiving portion 168 coupled to one end for receiving a portion of luggage rack 104. Rack receiving portion 168 comprises a curved portion 170 with a cutout 172 into which an additional portion of rack 104 rests/is inserted. This provides added stability to the bicycle rack 100 once it is secured to luggage rack 104. A fastener 174 passes through hole 176 in an other end of body 166 as well as a corresponding hole in rack 104, securing bracket 130 to the luggage rack 104. Securing bracket 130 can be have a sleeve 175 coupled to a lower surface of bracket 130 into which fastener 174 threads. The fastener 174 can be any type of fastener, including but not limited to screws, bolts with nuts, nails, rivets, zip ties, rope, steel wire, and rods locked by one or more cotter pins. Preferably, fastener 174 is a Porsche OEM bolt that is 8 mm wide by 76 mm long.

All components of the bicycle rack 100 described above can be made from a variety of materials, including but not limited to metal, plastic, composite materials, and natural materials such as wood or bamboo.

A method of using the bicycle rack 100 comprises the steps of:

a) coupling the front wheel support 106 to the luggage rack 104;

b) coupling the frame support 108 to the luggage rack 104;

c) coupling the front wheel 107 of the bicycle 102 to the front wheel support 106; and d) coupling the bicycle frame 103 to the frame support 108.

Steps a) and b) can be performed in any order, and once steps a) and b) are performed, steps c) and d) can be performed in any order.

Step a) can comprise using fasteners 118 to secure the front wheel support 106 to the luggage rack 104.

Step b) can comprise the steps of i) coupling first support bracket 130 to the luggage rack 104; ii) coupling second support bracket 150 to luggage rack; and iii) coupling main body 124 to the first support bracket 130 and the second support bracket 150. Steps i) and ii) can be performed in any order.

The bicycle rack 100 of the present invention has many advantages. Those advantages include:

a) the bicycle rack 100 precisely and solidly attaches to the period style Lietz luggage rack 104 which in turn is physically connected directly to the Porsche 356;

b) the bicycle rack 100 provides an adjustable platform to accommodate bicycle frames of multiple dimensions and lengths via FIG. 3 support bracket 128 and FIG. 3 knob 130, multiple components of the bicycle rack 100 can be adjusted to accommodate bicycles of different sizes and configurations as well as accommodate different mounting configurations on the luggage rack 104.

c) the bicycle rack 100 provides a platform to attach the front wheel up to 32" in diameter;

d) the bicycle rack 100 provides an adjustable platform so the Porsche 356 rear deck lid can be opened without removing bicycle rack 100 from the Lietz luggage rack 104;

e) the bicycle rack 100 leverages the design of the Lietz rack 104, which can be seen in FIGS. 6 and 7 via the connection of luggage rack receiving portion 154 to luggage rack 104, and FIG. 10 via the connection of luggage rack receiving portion 168, curved portion 170, and cutout 172 to luggage rack 104, and FIG. 11, via the connection of luggage rack receiving portion 168 to luggage rack 104;

f) the bicycle rack 100 uses bicycle industry standard hardware to connect the bike front fork 105 to the bicycle rack 100;

g) the bicycle rack 100 supports bike 102 so the bike rear wheel, 111, never touches the car/vehicle, the bicycle rack 100 or the luggage rack 104;

h) due to the "i-beam" design, the bicycle rack 100 is light in weight (6 pounds, 15 ounces) and minimizes noise and vibration at high speeds;

i) the front wheel support 106 being separate from the frame support 108 is desirable because the bicycle rack 100 is therefore made up of separate components, making the rack 100 lighter and easier to couple to the luggage rack 104; and j) the bicycle rack 100 is easy to assemble—only a couple fasteners are needed to secure the bicycle rack 100 to the luggage rack 104.

Having thus described the invention, it should be apparent that numerous structural modifications and adaptations may be resorted to without departing from the scope and fair meaning of the instant invention as set forth herein above and described herein below by the claims.

While particular forms of the invention have been illustrated and described, it will also be apparent to those skilled in the art that various modifications can be made without departing from the spirit and scope of the invention.

Although the present invention has been described in considerable detail with reference to certain preferred embodiments, other embodiments are possible. The forgoing description is not intended to be exhaustive or to limit the invention to the precise form disclosed. Many modifications and variations are possible in light of the above teaching. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments/methods contained in this disclosure. All references cited herein are incorporated by reference. Insofar as the description above and the accompanying drawings disclose any additional subject matter that is not within the scope of the claims below, the inventions are not dedicated to the public and the right to file one or more applications to claim such additional inventions is reserved.

What is claimed is:

1. A bicycle rack configured to hold a bicycle, the bicycle having a frame, a pair of front forks, a front wheel, and a rear wheel, the bicycle rack configured to mount to a luggage rack on a vehicle, the bicycle rack comprising:
   a) a bicycle front wheel support, the bicycle front wheel support comprising:
      i) a first pair of elongate members configured to couple to the luggage rack, the first pair of elongate members each having a proximate end and a distal end, wherein the proximate ends of the first pair of elongate members are coupled to each other by a base member, and the distal ends of the first pair of elongate members each comprise a U-shaped recess for supporting the front wheel of the bicycle, the base member comprising at least one hole there through for coupling to the luggage rack with a fastener; and
   b) a bicycle frame support, wherein the bicycle frame support comprises:
      i) an elongate main body having two opposed ends;
      ii) a forks mount configured to couple to one of the opposed ends of main body and to removably couple to the front forks of the bicycle, the front fork mount comprising:
         1) a hollow body;
         2) an axle disposed through the hollow body, the axle having two opposed ends comprising a first end and a second end; and
         3) a clamping assembly coupled to the first end of the axle, the clamping assembly comprising a spring biased locking handle and configured to pull the second end of the axle towards the first end of the axle, thereby clamping the forks of the bicycle between the hollow body and the first and second ends of the axle;
      iii) an adjustable rear frame support comprising a second pair of elongate members configured to releasably couple to each other, the second pair of elongate members comprising an upper member and a lower member, and the lower member is coupled to a second support bracket which is configured to secure both the rear frame support and the main body to the luggage rack, wherein the rear frame support is adjustable to accommodate different sized bicycles; and
      iv) an adjustable first support bracket configured to couple the main body to the luggage rack, the first support bracket comprising a threaded rod configured for inserting through a hole in the main body and threadedly coupling to a rotating knob, wherein tightening of the knob on the threaded rod clamps the main body to the first support bracket, securing the main body to the luggage rack.

2. The bicycle rack of claim 1, wherein the second pair of elongate members of the rear frame support each comprises a plurality of holes there through for insertion of at least one fastener for securing the second pair of elongate members to each other.

3. The bicycle rack of claim 1, further comprising a pair of straps for securing the bicycle to the luggage rack.

* * * * *